United States Patent [19]

King, Jr.

[11] Patent Number: 4,541,615
[45] Date of Patent: Sep. 17, 1985

[54] GUIDE ROLLER FOR FEEDING ELECTRICAL WIRE INTO CONDUIT

[76] Inventor: Zelbert D. King, Jr., 2051 Naperville Rd., Plainfield, Ill. 60544

[21] Appl. No.: 546,705

[22] Filed: Oct. 28, 1983

[51] Int. Cl.⁴ .............................................. E21C 29/16
[52] U.S. Cl. ............................ 254/134.3 FT; 254/390; 254/415
[58] Field of Search ............... 254/134.3 R, 134.3 PA, 254/134.3 FT, 388–415

[56] References Cited

U.S. PATENT DOCUMENTS

| | | | |
|---|---|---|---|
| 468,098 | 2/1892 | Hayward | 254/388 |
| 710,907 | 10/1902 | Thompson | 254/409 |
| 1,567,694 | 12/1925 | Amrin | 254/412 |
| 3,038,702 | 6/1962 | Trunnell | 254/134.3 FT |
| 3,052,450 | 9/1962 | Trunnell | 254/134.3 FT |
| 3,077,337 | 2/1963 | Cronkright | 254/394 |
| 3,363,879 | 1/1968 | Imik | 254/139.3 FT |
| 3,834,674 | 9/1974 | Jackson | 254/394 |
| 4,358,089 | 11/1982 | Metcalf | 254/134.3 FT |
| 4,456,225 | 6/1984 | Lucas | 254/139.3 FT |

FOREIGN PATENT DOCUMENTS 181215 10/1962 Sweden .................. 254/290

*Primary Examiner*—Robert C. Watson
*Attorney, Agent, or Firm*—Ernest Kettelson

[57] ABSTRACT

A guide such as a roller and bracket means to feed electrical wires through conduit when wiring a building or other installation for electrical service, comprising a first bracket having hook means to mount to a junction box or to a second bracket, the first bracket also including an axle supported by said hook means, a roller mounted for rotation on the axle, whereby the roller is positioned for alignment with the open end of an electrical conduit connected to the junction box when the first bracket is hung thereon or on said bracket. Electrical conductors can then be fed smoothly and freely over the roller, into and through the conduit without scraping or catching on a portion of the junction box or other structure. The second bracket is used when necessary to face the roller sideways, or at a right angle to its position when the first bracket alone is hooked to a portion of the box. The second bracket includes a flat surface portion having apertures to receive the hooks of the first bracket, and connecting means to connect the second bracket and the junction box in a way to position the roller on the axle of the first bracket in said sideways or a right angle position. Both brackets can be connected quickly to already provided apertures or screws in the box itself.

17 Claims, 6 Drawing Figures

GUIDE ROLLER FOR FEEDING ELECTRICAL WIRE INTO CONDUIT

BACKGROUND OF THE INVENTION

This invention relates to the field of electrical wiring, and in particular to devices which facilitate feeding electrical conductors into and through electrical conduit connected to junction boxes or wiring device boxes for electrical outlets and switches.

Prior art devices of this kind include more complex mechanisms to mount to the box or to some other structure, requiring clamps, or separate screws and bolts, and various other kinds of mounting and connecting devices, to mount the quide for the electrical conductor in position for pulling wires through the conduit and box to which the conduit is connected. Also prior art devices which are adapted for use in pulling wires through electrical conduit, generally utilize the mechanical advantage feature of any pulleys that may be used, that is the leverage inherent in the use of a pulley to lessen the manual pulling force required on the part of the workman himself. In order to make use of this inherent mechanical advantage of pulleys it is necessary to mount the pulley rigidly to the box or some structure near the box. Thus, the prior art devices of this kind include rigid mounting or positioning means, even if they may be used occasionally at the opposite end of the conduit for feeding wires into the conduit in addition to being used for pulling wires out of the conduit.

It does not appear to have occurred to anyone to provide a special guide, such as a guide roller, for the exclusive purpose of feeding electrical conductors into electrical conduit in which the case the guide does not have to be rigidly mounted since no leverage or mechanical advantage is available in any event at the trailing end of the conduit and wire.

The advantage of not having to mount the guide, such as a roller guide, rigidly is that it can be mounted rapidly, almost instantaneously by simply hooking into one or two of the already existing apertures on junction boxes or by simply and quickly hooking on to the already existing screws of wiring device boxes, sometimes called outlet boxes, for electrical outlets and electrical switches. An electrician can thus with the present invention, quickly hook the guide, such as a roller guide, to the junction or outlet box at the feed-in side with the conductors or wires in place on the roller (or other guide) and fed through the conduit with the end of the leader or pull-through wire projecting out the other end of the conduit, then move to the pull-through side and begin pulling the wires through. The roller or other guide in accordance with this invention keeps the wires from kinking, scraping or catching at the feed-in side, so a separate workman is not needed at that end a single workman can thus draw the wires through without damage from scraping, catching or kinking at the feed-in side.

Examples of prior art devices are disclosed in U.S. Pat. Nos. 4,358,089; 4,033,551; 3,944,184; 3,113,759; 2,746,715; and 2,727,721. All of these disclose rigidly mounted, or rigidly held guides or pulleys so they can be used either exclusively for pulling wires through, or for pulling as well as feeding wires through electrical conduit. None appear to be exclusively for feeding wires into the conduit, and they accordingly do not have the quick-connect or quick-mount feature of the present invention. Time is such an essential factor in electrical wiring that this feature alone of the present invention is of great value.

SUMMARY OF THE INVENTION

It is an object of the invention to provide a quick-mount guide for quickly mounting to a structure in position for feeding electrical conductors into electrical conduit connected to an electrical box so as to prevent said conductors from scraping, kinking and catching as they are pulled through the conduit.

It is an object of the invention to provide a quick-mount guide to feed electrical conductors into electrical conduit without the need for an additional workman at the feed-in side.

It is an object of the invention is to provide a quick-mount guide to feed electrical conductors into electrical conduit connected to an electrical box, comprising a roller rotatably mounted to a quick-mount bracket for quickly mounting said roller in position facing the open end of said conduit.

It is an object of the invention to provide a quick-mount guide to feed electrical conductors into electrical conduit connected to an electrical box, comprising a bracket having hook means to quickly hook into an existing aperture or into or over another existing part of said electrical box.

DESCRIPTION OF THE PREFERRED EMBODIMENT

Figure 1:
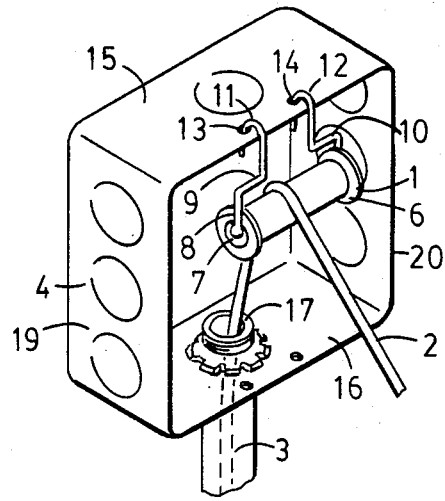
FIG. 1 is a perspective view of a quick-mount guide assembly to feed electrical conductors into electrical conduit in accordance with this invention hooked to a pair of existing apertures in the top wall of an electrical junction box showing the roller part of the assembly in position to feed an electrical wire into a conduit opening to the bottom wall of the box.

A quick mount guide assembly 1 is provided in accordance with this invention for guiding electrical wires 2 as they are fed into electrical contuits 3, connected to an electrical junction box 4 or wiring device box 5 for mounting of electrical outlets or switches, to prevent the wires 2 from scraping, catching or kinking as they are drawn through from the opposite end of the conduit 3.

The guide assembly 1 includes a guide roller 6 rotatably mounted on the axle 7 of a hanger 8 having a pair of arms 9 and 10 extending outwardly from each opposite end of the axle 7 in a direction generally normal thereto. The arms 9 and 10 turn inwardly toward each other in an L-shaped bend and terminate at their outward free ends in hooks 11 and 12, spaced apart a preslected distance. Such pre-selected distance is chosen to match that which already existing apertures 13 and 14 are spaced apart on the wall 15 and 16 of standard electrical junction boxes 4. The hooks 11 and 12 are thereby readily seated in such apertures 13 and 14 of said junction boxes 4 to quick mount the hanger 8 and guide roller 6 to the box 4 in position to guide electrical wires 2 into a conduit 3 connected to and opening to the opposite wall. For example: as shown in FIG. 1, the hooks 11 and 12 of the hanger 8 are seated in apertures 13 and 14 of the top wall 15 of junction box 4 whereby the guide roller 6 is positioned to guide the electrical wire 2 into the opening 17 to conduit 3 in the bottom wall 16 of the box 4.

A pivot means 18 is provided to change the direction which guide roller 6 faces when desired to feed wires 2 into conduit 3 which opens to one of the side walls 19 or 20 of the junction box 4. The pivot means in accordance with a preferred embodiment of this invention comprises a bracket 21 having a flat plate 22 and a hook member 23 extending outwardly from the upper edge 24 of the plate 22. A pair of spaced apart apertures 130 and 140 are provided adjacent the lower edge 25 of the plate 22, spaced apart the same pre-selected distance as are hooks 11 and 12 of the hanger 8. The plate 22 also includes a hookable aperture 26 centered therein, having an enlarged opening 27 large enough to receive therethrough the screw head 28 of screws 29 which are usually pre-existing and already in place in wiring device boxes 5, along the upper edge 30 and bottom edge 31 of such wiring device boxes 5 of the type used to mount electrical outlets and switches; such hookable aperture 26 having a slot 32 of narrower cross-sectional dimension extending upwardly from said enlarged opening 27, the cross-sectional dimension of slot 32 corresponding to the cross-sectional dimension of the threaded shank 33 of the screws 29.

Figure 2:
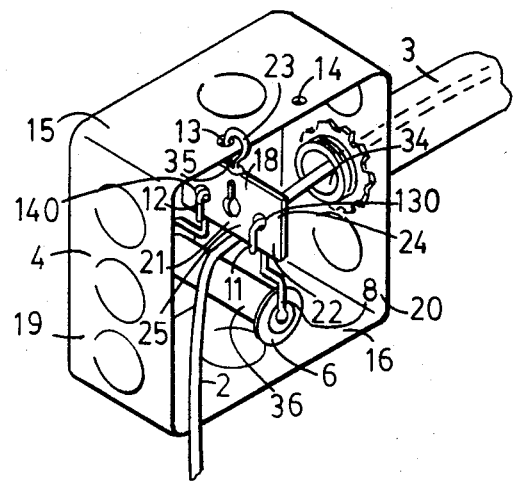
FIG. 2 is a perspective view of a quick-mount guide assembly for feeding electrical conductors into electrical conduit in accordance with this invention, showing the hanger on which the roller part of the assembly is mounted hooked to a bracket which is in turn hooked to a single one of the existing apertures of the box thereby enabling the roller to face a side wall of the box to feed electrical wires into a conduit opening to that side wall.

Use of the bracket 21 to face guide roller 6 toward side wall 20 of junction box 4 is shown in FIG. 2, whereby a wire 2 may be fed over the roller 6 into the opening 34 to conduit 3 connected in this case to the side wall 20 of the box. The hooks 11 and 12 of hanger 8 are seated in apertures 130 and 140 of the plate 22 of bracket 21, and the hook member 23 of bracket 21 is seated in the pre-existing aperture 13 in the top wall 15 of junction box 4. The return portion 35 which terminates at the free end of hook member 23 lies in the same plane as the flat plate 22, whereby when hook member 23 is seated in aperture 13 in top wall 15 of box 4, the flat plate 22 hangs loosely in a plane that is substantially parallel to the side walls 19 and 20 of the box 4. In this position the apertures 130 and 140 in flat plate 22 are facing the side walls 19 and 20, as is the spool surface 36 of the roller 6 when hooks 11 and 12 of hanger 8 are seated in said apertures 130 and 140 to suspend the roller 6 from the bracket 21.

Figure 6:
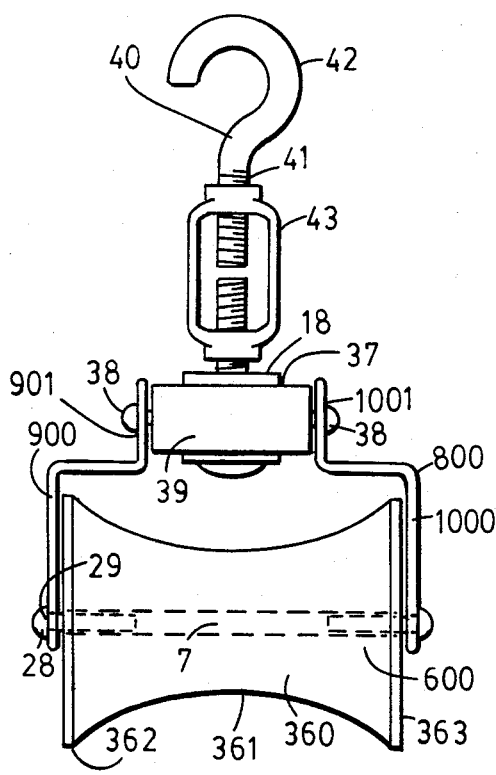
FIG. 6 is a front elevation view of a modified hanger in accordance with this invention and a modified guide roller in accordance with this invention rotatably mounted on the axle of the hanger.

A modified roller 600 and hanger 800 is illustrated in FIG. 6, wherein the spool surface 360 is concave in configuration, tapering inwardly toward the center 361 from diverging outer edges 362 and 363. The hanger 800 includes side arms 900 and 1000 extending from opposite ends of the axle 7 on which roller 600 is rotatably mounted, the arms 900 and 1000 curving inwardly past the outer edges 362 and 363 of the spool 360, terminating in a pair of spaced apart end plates 901 and 1001. A pivot member 37 is secured between the end plates 901 and 1001 by rivets 38 holding the body portion 39 of pivot member 37 to the end plates. A single adjustable hook member 40 is pivotally mounted to the body portion 39, its shank 41 extends upwardly therefrom terminating in the hooked end 42. The shank 41 is in two parts, coupled together by a turnbuckle 43 in which threaded portions of the shank 41 are seated at each end. Thus turnbuckle 43 may be rotated in one direction to shorten the shank 41 and in the opposite direction to lengthen it. In this way, the spool 360 of roller 600 can be adjusted for better alignment with whatever opening is to be used in the side walls of the junction boxes 4 for feeding wires into a conduit connected to such opening, when the hooked end 42 is seated in one of the apertures 13 or 14 in the top wall 15 of box 4.

With this modified hanger 800 and roller 600 the separate bracket 21 is not needed to change the facing direction of the roller and its spool surface. If it is desired to feed a wire 2 into the opening 17 to conduit 3 in the bottom wall 16 of box 4 as seen in FIG. 1, the modified roller 600 is pivoted to the position shown in FIG. 1 for roller 6. If it is desired to feed a wire 2 into the opening 34 to conduit 3 connected to the side wall 20 of box 4 as seen in FIG. 2, all that is required is to pivot the modified hanger 800 to face the spool surface 360 of roller 600 toward the opening 34. The turnbuckle 43 can then be rotated in the direction to either lengthen or shorten the shank 41 of the hook member 40, if the height of the modified roller 600 has to be adjusted to line up properly for feeding the wire 2 into the conduit 3 through the opening 34 in side wall 20.

Figure 3:
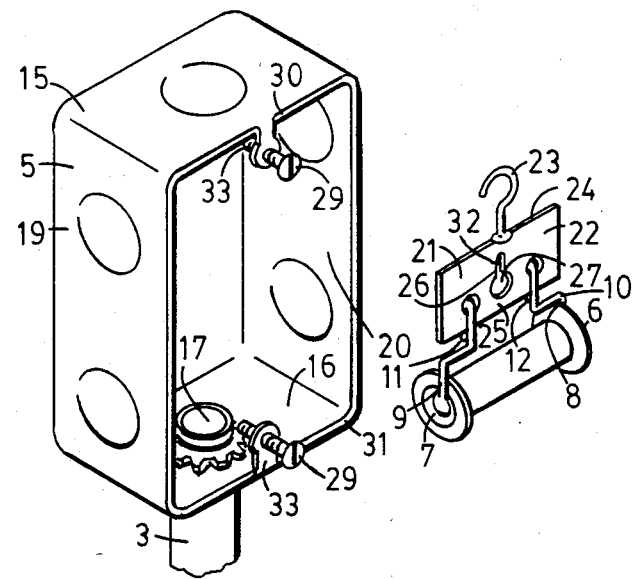
FIG. 3 is a perspective exploded view of a quick-mount guide assembly as shown in FIG. 2, positioned for quick connection to a wiring device box for outlets or switches by hooking over an existing screw threaded in a tap along the upper edge of the box which will position the roller to feed electrical wires into a conduit opening to the bottom wall of the wiring device box.

For boxes which do not have pre-existing apertures in which to seat the hooked ends 11 and 12 of hanger 8, or the other hooks described above, such as wiring device boxes 5 for outlets and switches but which do have pre-existing screws 29 already in place along the upper and lower edges, the bracket 21 may be used to provide a place for hooking the hanger 8 and roller 6 in place. The hookable aperture 26 in the center of the flat plate 22 of bracket 21 is placed in registry with the screw 29 in place along the upper edge 30 of wiring device box 5 as shown in FIG. 3, the head 28 of screw 29 received through enlarged opening 27 of the hookable aperture 26 and the shank 33 of screw 29 then seated in the slot 32 of the hookable aperture 26. The bracket 21 is thus quickly hooked in place on the wiring device box 5 for feeding a wire 2 over the spool surface 36 of roller 6 down into the conduit 3 connected to the bottom wall 16 of box 5 through the opening 17 thereto.

Figure 4:
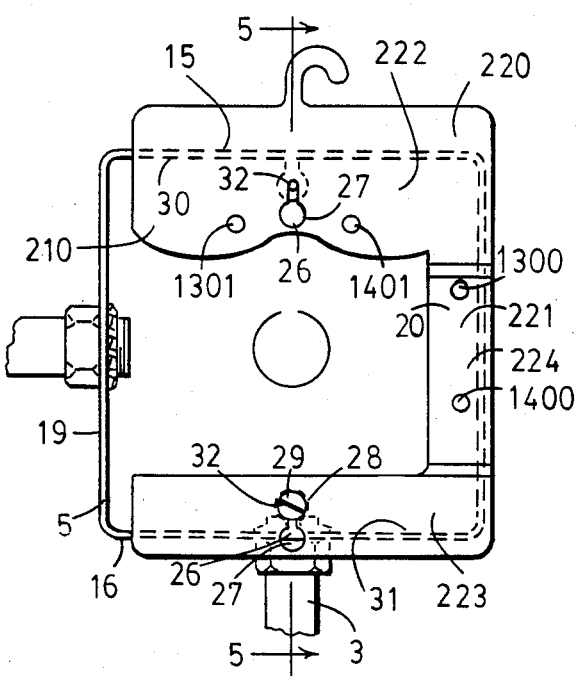
FIG. 4 is a front elevation view of a modified bracket in accordance with this invention comprising a peripheral frame having upper and lower recesses to hook over upper and lower existing screws along the upper and lower edges of a wiring device box, such bracket including two pairs of apertures each pair spaced apart in planes which are at right angles to each other to receive the hooks of the hanger on which the guide roller is mounted whereby the roller can be positioned both ways to feed in electrical wires to conduits which open both to a top or bottom wall or to either of the two side wall, the modified bracket being reversible for mounting with either side facing in or out and either end facing up or down.
Figure 5:
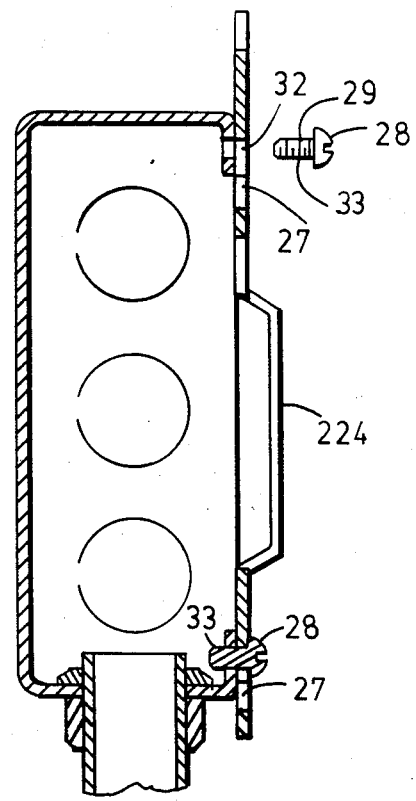
FIG. 5 is a section view of the modified bracket shown in FIG. 4, taken on Line 5—5.

A modified bracket 210 is shown in FIGS. 4 and 5 for use with boxes which have pre-existing screws but do not have pre-existing apertures in the side walls to receive hooks.

The modified bracket 210 comprises a plate body 220 having a vertically extending leg 221, an upper horizontally extending broad surface leg 222 projecting outwardly in one direction from the vertical leg 221 and being substantially normal thereto, and a lower horizontally extending narrower surface leg 223 projecting outwardly in the same direction as upper leg 222. The vertical leg 221 includes an outwardly stepped plate section 224. The general dimension of the length of the vertical leg corresponds to the height of a wiring device box 5, and the general dimension of the length of the horizontal legs 222 and 223 corresponds to the width of such wiring device box 5.

A hookable aperture 26 is provided through the central portion of upper horizontal leg 222 for hooking over screw 29 provided along the upper edge 30 of box 5, and a similar hookable aperture 26 is also provided through the central portion of lower horizontal leg 223 for hooking over screw 29 provided along the lower edge 31 of the box 5. The hookable apertures 26 include the enlarged openings 27 as described above to receive therethrough the screw heads 28 and the narrower dimensioned slots 32 in which the shanks 33 of the screws 29 are seated to secure the modified bracket 210 to the wiring device box 5.

In one form of the modified bracket 210, the vertical leg 221 does not include the outwardly stepped section 224, but is completely coplanar throughout with horizontal legs 222 and 223. In such form, the bracket 210 is reversible, and can be hooked to box 5 as described above with either side 45 or 46 facing outwardly, whereby the apertures 1300 and 1400 through the vertical leg for receiving hooks 11 and 12 of hanger 8 can be positioned along either side wall 19 or 20 of the box 5 to feed wires 2 into conduit 3 opening to either of the respective side walls. The apertures 1300 and 1400 through vertical leg 221 are positioned inwardly of the surface thereof far enough to clear the side wall 19 or 20 lying adjacent thereto when the hookable apertures 26 through horizontal legs 222 and 223 are hooked over the screws 29 along the upper and lower edges of the box 5.

When modified bracket 210 is mounted on box 5 as shown in FIG. 4, the hooks 11 and 12 of hanger 8 may be seated in apertures 1300 and 1400 of the vertical leg 221, which will position the roller 6 to rotate on a substantially vertical axis lined up to feed a wire 2 into the conduit 3 connected to side wall 19 of the box 5. Apertures 1300 and 1400 are spaced apart in a substantially vertical plane the same pre-selected distance as the hooks 11 and 12 are spaced apart.

Similar spaced apart apertures 1301 and 1401 are also provided in the broad surface upper horizontal leg 222, such apertures being spaced apart in a substantially horizontal plane the same pre-selected distance as hooks 11 and 12 are spaced apart. Thus, hooks 11 and 12 of hanger 8 may also be seated in apertures 1301 and 1401 of the horizontal leg 222 of this modified bracket 210, whereupon the roller 6 will be in position to rotate on a substantially horizontal axis lined up to feed a wire 2 into the conduit 3 which is shown in FIG. 4 connected to the bottom wall 16 of the box 5.

The rollers, hangers and brackets described herein may be made of metal, or they may be made of various types of synthetic materials and plastics. In certain applications, it is desirable to make these parts of electrically non-conductive materials or to cover any conductive materials with non-conductive materials such as rubber or plastic.

While the invention described herein is particularly useful for feeding electrical wires into electrical conduit, it can be made in other sizes, shapes and materials for use in feeding any kind of continuous length flexible item into a tubular structure to keep it from scraping, catching or kinking as it is played out from a coil or otherwise fed into and through the tubular structure, where there is a pre-existing structure of some kind in which or on which the guide in accordance with this invention can be quickly mounted such as by hooking thereon and where there is no need for the guide to be rigidly mounted.

The guide means that has been described in this specification is a roller or spool, and that is a preferred embodiment. However, a non-rotating guide may be used also within the scope of this invention, such as a stationary drum or glide having a smooth friction reducing surface. A drum or glide having an arcuate surface may be used, or a cylindrical surface as the rollers 6 and 600 have as shown and described in this specification and drawings, but being stationary and non-rotatable.

I claim:

1. A quick mount guide to feed a flexible continuous length item into an opening to a tubular structure, including said tubular structure, said tubular structure including connecting means spaced apart from said opening thereto for connection of said quick mount guide thereto, said quick mount guide comprising a guide member, quick mount means to quickly mount said guide member to said connecting means to support said guide member in position to feed said continuous length item over said guide member and into said opening to said tubular structure as said continuous length item is being drawn in the direction from said quick mount guide into the opening to said tubular structure, said guide means including surface means to prevent scraping and catching of said continuous length item as it is being fed into said opening to said tubular structure, said connecting means and said quick mount means providing a swingable connection for said guide member and so located with reference to said opening to said tubular member whereby said guide member can swing to closer alignment with opening to and longitudinal axis of said tubular member by the pull of said continuous length item itself as it is being drawn into and through said tubular structure.

2. A quick mount guide as set forth in claim 1, wherein said flexible continuous length item is an electrical wire.

3. A quick mount guide as set forth in claim 2, wherein said tubular structure comprises an electrical conduit connected to an electrical box, including said electrical box.

4. A quick mount guide as set forth in claim 1, wherein said guide member and surface means to prevent scraping and catching includes a roller mounted for rotation on said quick mount means having a circular spool surface for said flexible continuous length item to pass over as it is fed into said opening to said tubular structure.

5. A quick mount guide as set forth in claim 4, wherein said quick mount means includes hook means to hook to said connecting means, said connecting means includes aperture means to receive said hook means thereby providing said swingable connection for said guide member.

6. A quick mount guide as set forth in claim 5, wherein said hook means includes a hook member comprising a shank extending from said quick mount means terminating at its free end in a bend and return portion, said aperture means includes an aperture in said connecting means to receive said return portion of said hook member therein.

7. A quick mount guide as set forth in claim 4, wherein said quick mount means includes a flat plate portion, an aperture through said plate portion, said connecting means includes a projecting member receivable through said aperture of said plate portion for connecting said quick mount means to said connecting means, said plate portion including a pair of additional apertures therein, said quick mount means including an axle for said roller to rotate on and a pair of hooks extending from respective opposite ends of said axle for reception in corresponding ones of said pair of additional apertures in said plate portion of said quick mount means to thereby provide said swingable connection for said guide member.

8. A quick mount guide as set forth in claim 3, wherein said electrical box includes a top wall, a bottom wall, a pair of spaced apart side walls extending between said top wall and said bottom wall, said electrical conduit connected to and opening to a first one of said walls, said connecting means including an aperture in a second one of said walls opposite from said first one of said walls, and said guide member includes a roller mounted for rotation on said quick mount means, said quick mount means includes a hook member to be received in said aperture in said second one of said walls of said electrical box to support said roller in position to feed said length of electrical wire over said roller and into said opening to said conduit connected to said opposite first one of said walls of said electrical box as said electrical wire is drawn in the direction from said quick mount guide into and through said conduit.

9. A quick mount guide as set forth in claim 3, including an electrical box having a top wall, a bottom wall, a pair of spaced apart side walls extending between said top wall and said bottom wall, said connecting means including a pre-existing aperture in a first one of said walls opposite from a second one of said walls, said guide member includes a roller mounted for rotation on said quick mount means, said quick mount means includes pivot means to pivot the axis of rotation of said roller between a first position and a second position, said pivot means including a hook member extending therefrom to hook in said pre-existing aperture in said first one of said walls, said first position being such that said roller is in position to feed said length of electrical wire over said roller and into a said conduit connected to and opening to said second one of said walls opposite from said first wall in which said pre-existing aperture is located and in which said pivot means is hooked, said second position being such that said axis of rotation of said roller is rotated ninety degrees from its location in said first position whereby said roller is in position to feed said length of electrical wire over said roller and into a said conduit connected to and opening to one of said other two walls of said box.

10. A quick mount guide as set forth in claim 9, wherein said pivot means includes a pivot body member, said hook member being pivotally mounted to said body member for pivotal movement of said body member relative to said hook member between said first and second positions, said quick mount means including a pair of arms connected to said pivot body member and extending therefrom respectively to opposite sides of said roller to support said roller for rotation.

11. A quick mount guide as set forth in claim 3, wherein said electrical box includes a top wall, a bottom wall, a pair of spaced apart side walls extending between said top wall and said bottom wall, said electrical conduit connected to and opening to a one of said side walls, said connecting means including an aperture in said top wall, said guide member includes a roller mounted for rotation on said quick mount means, said quick mount means including a pair of spaced apart hook members, a bracket member having a pair of spaced apart apertures to receive said spaced apart hook members, a bracket hook member extending from said bracket member having a shank connected to said bracket member and terminating in a bend and return portion, said return portion hooking into said aperture in said top wall of said box, said shank and return portion of said bracket hook member lying in the same plane, the axes of said pair of spaced apart apertures in said bracket intersecting said plane at substantially right angles, whereby when said bracket hook member is hooked in said aperture in said top wall of said box and said hook members of said quick mount means are hooked into said spaced apart apertures of said bracket member the said roller is supported in position to feed said length of electrical wire over said roller and into said conduit connected to said one of said side walls of said electrical box.

12. A quick mount guide as set forth in claim 9, wherein said hook member includes adjustable length means.

13. A quick mount guide as set forth in claim 12, wherein said adjustable length means of said hook member includes a pair of threaded shank portions of said hook member, a turnbuckle, respective ones of said pair of threaded shank portions being threadedly seated in opposite ends of said turnbuckle, whereby said shank of said hook member is shortened when said turnbuckle is rotated in one direction and lengthened when rotated in the opposite direction.

14. A quick mount guide as set forth in claim 3, wherein said electrical box includes a top wall, a bottom wall, a pair of spaced apart side walls extending between said top wall and said bottom wall, said electrical conduit connected to and opening to said bottom wall, said connecting means including a screw having a screw head and a screw shank, said screw shank being threaded into a tap formed along the edge of said top wall of said box, a bracket member having a flat plate portion, an aperture therein having an enlarged portion to receive said screw head therethrough and a slot portion extending from said enlarged portion to receive said screw shank in said slot portion when said bracket is mounted on said screw, a pair of spaced apart apertures in said flat plate of said bracket, said guide member including a roller mounted for rotation on said quick mount means, said quick mount means includes a pair of spaced apart hook members to hook in said pair of spaced apart apertures in said flat plate of said bracket, whereby said roller is supported in position to feed said length of electrical wire over said roller and into said opening to said conduit connected to said bottom wall of said electrical box as said electrical wire is drawn in the direction from said quick mount guide into and through said conduit.

15. A quick mount guide as set forth in claim 3, including an electrical box having a top wall, a bottom wall, a pair of spaced apart side walls extending between said top wall and said bottom wall, said connecting means including a first screw having a screw head and a screw shank, said screw shank being threaded into a first pre-existing tap formed along the top edge of said box, a second screw having a screw head and a screw shank, said screw shank of said second screw being threaded into a second pre-existing tap formed along the bottom edge of said box, a bracket member comprising a vertical leg corresponding in length to the height of said walls of said box, an upper broad surface horizontal leg extending in one direction from the upper end of said vertical leg corresponding in length to the width of said top wall, a lower horizontal leg extending in the same direction from the lower end of said vertical leg corresponding in length to the width of said bottom wall, a first hookable aperture in said upper horizontal leg having an enlarged portion to receive said screw head of said first screw therethrough and a slot portion extending from said enlarged portion to receive said screw shank in said slot portion when said bracket is hooked on to said box, a second hookable aperture in said lower horizontal leg having an enlarged portion to receive said screw head of said second screw therethrough and a slot portion extending from said enlarged portion to receive said screw shank of said second screw in said slot portion when said bracket is hooked on to said box, a first pair of spaced apart apertures through said upper horizontal leg whose axes lie in a first horizontal plane, a second pair of spaced apart apertures through said vertical leg of said bracket whose axes lie in a second vertical plane which intersects said first plane at substantially a right angle, said guide member including a roller mounted for rotation on said quick mount means, said quick mount means includes a pair of spaced apart hook members to hook in said first pair of spaced apart apertures when desired to position said roller for feeding said electrical wire into a conduit connected to and opening to said bottom wall of said box, and to hook in said second pair of spaced apart apertures when desired to position said roller for feeding said electrical wire into a conduit connected to and opening to the said side wall of said box which is opposite from the side wall adjacent to said vertical leg of said bracket.

16. A quick mount guide as set forth in claim 15, wherein said bracket is reversible, said bracket including a first planar surface facing in one direction, a second planar surface facing in the opposite direction, said first and second pair of hookable apertures being centrally located in said upper and lower horizontal legs respectively, whereby when hooked to said box with said first surface facing outwardly said vertical leg of said bracket lies adjacent one of said side walls of said box and when hooked to said box with said second surface facing outwardly said vertical leg of said bracket lies adjacent the other of said side walls of said box.

17. A quick mount guide as set forth in claim 15, wherein said vertical leg of said bracket includes an outwardly stepped section to space said section outwardly from said adjacent side wall of said box when said bracket is hooked thereto, said second pair of spaced apart apertures being located in said outwardly stepped portion of said vertical leg.

* * * * *